EXTREME VALUE SWITCHING DEVICE

Filed Nov. 14, 1963 2 Sheets-Sheet 1

INVENTORS
KLAUS DEHMELT
GUENTER STRASEN
GEORG GRAEBER
BY Gerald J. Weiss
ATTORNEY INVENTORS
KLAUS DEHMELT ET AL.
BY [signature]
AGENT

United States Patent Office 3,289,065
Patented Nov. 29, 1966

3,289,065

EXTREME VALUE SWITCHING DEVICE

Klaus Dehmelt, Frankfurt am Main, Guenter Strasen, Sprendlingen, and Georg Graeber, Ruesselsheim am Main, Germany, assignors to Varta Deutsche Edison-Akkumulatoren-Company Gesellschaft mit beschraenkter Haftung, Frankfurt am Main, Germany, a corporation of Germany Filed Nov. 14, 1963, Ser. No. 323,784
Claims priority, application Germany, Nov. 17, 1962, D 40,301
8 Claims. (Cl. 320—40)

The invention relates to a device which releases a switching mechanism, as soon as a value to be measured has traversed an extreme value.

When controlling or regulating the chronological course of values to be measured, it is often necessary to actuate a switching mechanism as soon as a value to be measured has traversed an extreme value, i.e., a maximum or minimum value. Heretofore, relatively complicated devices were used for solving this problem. These devices are ordinarily quite expensive and due to their sluggishness in response and susceptibility to break-downs have proved unsatisfactory.

According to the present invention this problem is solved by providing a simple device, consisting solely of electrical switching elements, which respond very readily and reliably, as soon as the value to be measured has traversed a maximum or minimum value. A prerequisite for using such a device is merely that the respective value to be measured is available as an electrical potential signal $U_E(t)$ or that it can be transformed thereinto by known methods.

The switching device according to the present invention can be used for many purposes. For instance, it can be employed in automatically controlling industrial production processes in which a pressure, temperature, concentration, electric current and the like traverses an extreme value.

Referring to the drawings, FIG. 1 is a circuit diagram of the present invention as used to actuate a switching device at minimum value;

Figure 2:
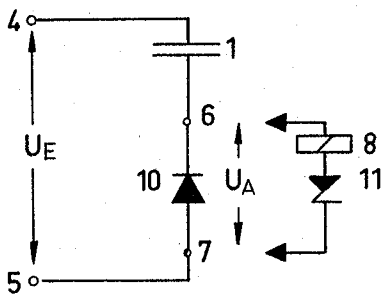
FIG. 2 is a circuit diagram showing the invention as used to actuate a switching device at maximum value.
Figure 2A:
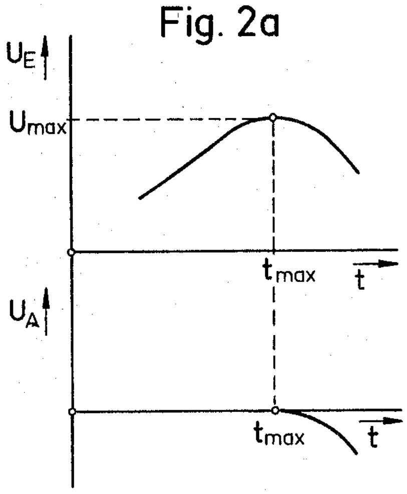
Figure 3A:
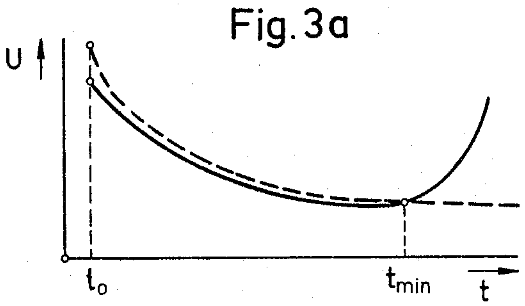
Figure 3:
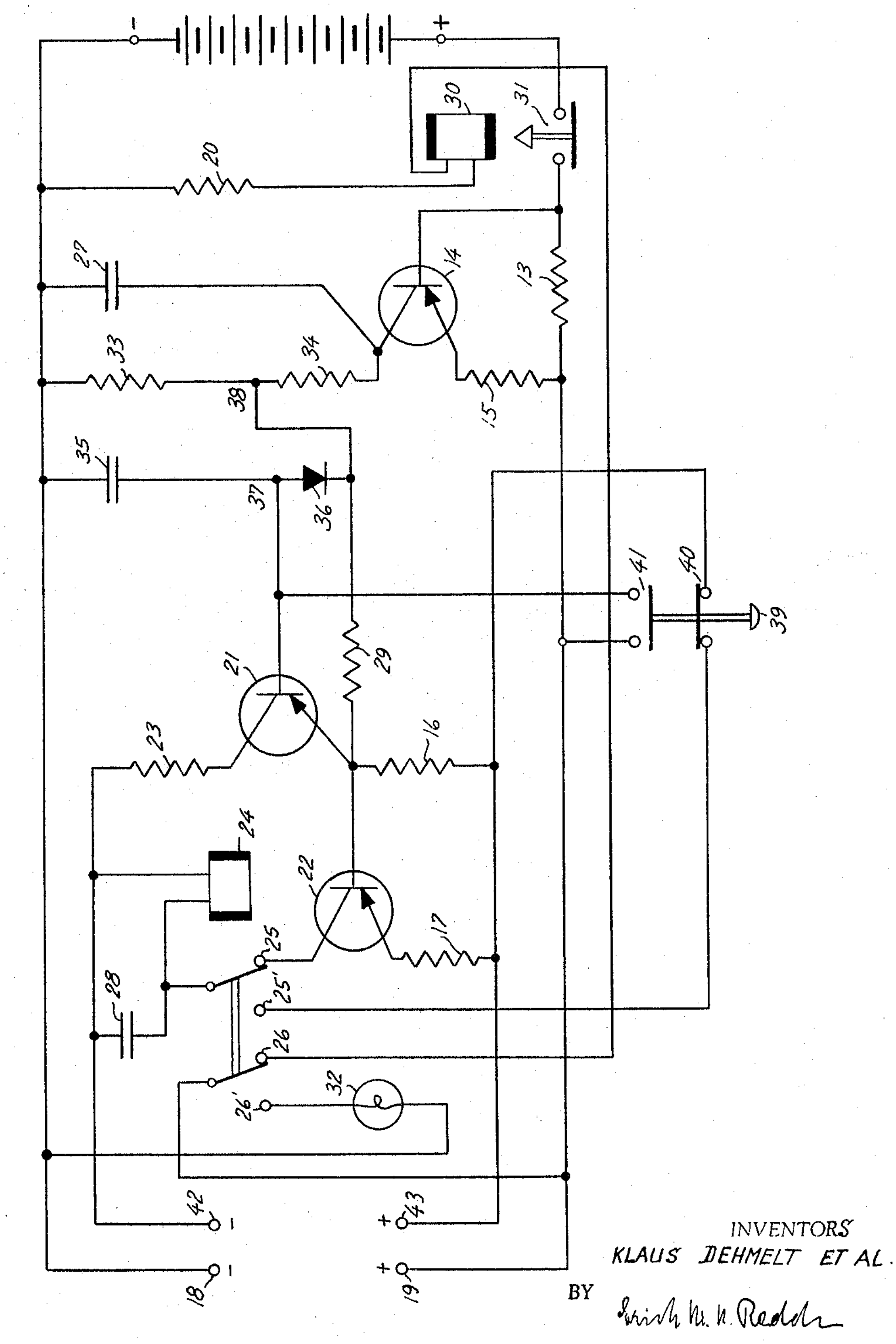

FIG. 2*a* is a graph showing the voltage response of the circuit of FIG. 2;

FIG. 3 is a circuit diagram showing a battery charging control device controlled according to the present invention; and FIG. 3*a* is a graph showing the voltage response of the circuit of FIG. 3.

Figure 1:
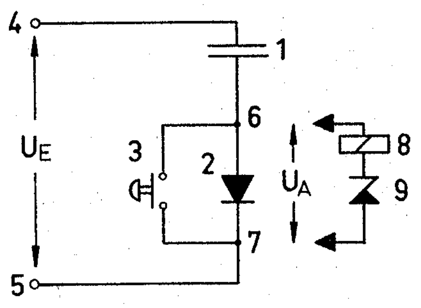
FIG. 1 is a graph showing the voltage response of the circuit of FIG. 1.
Figure 1A:
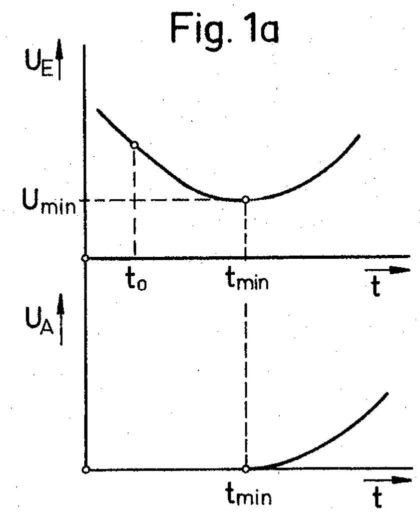

According to the present invention, FIG. 1 shows the switching device adapted to actuate a circuit when input voltage $U_E(t)$ has traversed a minimum value. This device is used when, for instance, the input voltage $U_E(t)$ progresses as illustrated in FIG. 1*a*.

In the circuit of FIG. 1, there is a charging condenser 1 in series with a blocking diode 2 across input leads 4 and 5. Across diode 2 and in series relation with capacitor or condenser 1 is normally-open switch 3. A type of voltage dependent device to be actuated by this unit could consist of a Zener diode 9 in series with a sensitive relay 8 which together may be connected across diode 2 at points 6 and 7. Diode 2 has a polarity such that it will prevent the input voltage $U_E(t)$ from charging condenser 1.

In operation, diode 2 is bridged over by briefly pushing key or button 3 at a time $t_0$ before input voltage $U_E(t)$ has reached its minimum value. Condenser 1 is thereby charged to the then value of $U_E(t)$ which is identified as $U_E(t_0)$. After disconnecting the contact key 3, condenser 1 can discharge itself via diode 2 as $U_E(t)$ decreases, so that the potential at switching point 6 will decrease as $U_E(t)$ decreases until $U_E(t)$ reaches its minimum value $U_{min}$. However, as soon as the potential $U_E(t)$, and likewise the potential at point 7, start to increase, diode 2 blocks the current flow from point 7 to point 6, so that the potential at point 6 remains constant. The potential across diode 2, i.e. across points 6 and 7, is defined as $U_A(t)$. This potential will also be applied across an output circuit such as that made up of relay 8 and Zener diode 9. The potential $U_E(t)$ equals $U_A(t)$ plus $U_{min}$. Therefore, $U_A(t)$ equals $U_E(t)$ minus $U_{min}$. Accordingly, as $U_E(t)$ starts to rise from its minimum, $U_A(t)$ will also rise and this increasing potential will be applied to the output circuits 8 and 9. According to the present invention a sensitive switching device depending on the current potential is regulated by the initial potential $U_A(t)$. This device thus effects switching as soon as $U_E(t)$ has traversed a minimum value and has again slightly increased, i.e. as soon as $$U_A(t)=U_E(t)-U_{min}$$

has exceeded a predetermined value.

The subsequently arranged voltage-dependent device may consist, for instance, of the above-described series connection of a sensitive relay 8 and a Zener diode 9 as shown in FIG. 1. Zener diode 9 initially prevents recharging of condenser 1 via relay 8. Only when $U_A(t)$ reaches the so-called Zener voltage, the condenser is suddenly charged via relay 8, whereby the relay briefly pulls up and effects the desired switching operation.

FIG. 1*a* depicts the input voltage $U_E$ and the output voltage $U_A$ against time $t$. The upper curve shows how the voltage $U_E$ varies from a high potential to a minimum and then to a high potential again. The lower curve shows the voltage $U_A$, as above-described. The voltage $U_A$ begins to rise from its initial potential only after voltage $U_E$ has reached its minimum.

FIG. 2 illustrates the switching device according to the present invention in case a switching operation is to be effected as soon as the input voltage $U_E(t)$ has traversed a maximum (peak) value, i.e. in case $U_E(t)$ assumes, for instance, the course illustrated in FIG. 2*a*. FIG. 2*a* shows the curves of $U_E$ and $U_A$ when a maximum is being sensed. These curves are similar to the curves of FIG. 1*a* except that they depict a maximum rather than a minimum point.

The circuit of FIG. 2 is the same as the circuit of FIG. 1 except that FIG. 2 has blocking diode 10 instead of blocking diode 2, diode 10 being reversed in polarity from that of diode 2; and FIG. 2 has Zener diode 11 instead of Zener diode 9, diode 11 also being of reversed polarity.

Accordingly, in FIG. 2 condenser 1 is charged without any possibility of being discharged. When the input voltage decreases, an increasing potential $$U_A(t)=U_{max}-U_E(t)$$

decreases via diode 10 (see FIG. 2*a*). As a result thereof the voltage-depending switching device is actuated in analogy to the above-described case, i.e. flashing of Zener diode 11 effects switching of relay 8. Starting key or button 3 is not required in this case.

To assure proper functioning of the device according to the present invention, it is only necessary that the self-discharge of condenser 1, the leakage current of diodes 2 and 10 in the blocking direction, and the leakage currents of Zener diodes 9 and 11 must be negligibly small.

If desired, voltage $U_A$ in either FIG. 1 or FIG. 2 may be amplified before being applied to the voltage dependent device, such as the relay 8 and the Zener diode 9 of FIG. 1 or the relay 8 and Zener diode 11 of FIG. 2. The use of such an amplifier will serve to further increase the sensitivity of response of the circuit.

The device according to the present invention is especially useful for controlling charging of gas-tight alkaline storage batteries. As is well known, the flow of the charging current of storage batteries proceeds, on charging under constant voltage, within a certain period of time as illustrated by $U_E$ in FIG. 1*a*. As long as active mass is still reacted during charging, the flow of the charging current decreases. As soon as the charging of the cells is completed, the flow of the charging current starts to increase and may attain, if charging is not controlled, the level of the initial charging current, i.e., a multiple of the rated charging current. Thereby, an undue increase in temperature of the cells results, which might cause destruction of the storage battery.

The charging current thus traverses a minimum value. Therefore, according to the present invention, the switching device, illustrated in FIG. 1, is provided for controlling the charging operation. FIG. 3 illustrates an example for a charging control device according to the present invention which is arranged between the source supplying constant voltage 18, 19, and the battery 12 to be charged.

Following the index numerals of said FIG. 3 are explained. The dimensions of the various switching elements are given in parentheses, for instance, when charging gas-tight storage batteries of ten cells each which are provided with sintered electrodes:

13 Resistance (0.5 ohm)
14 Transistor
15 Resistance (10 ohm)
16 Resistance (470 ohm)
17 Resistance (28 ohm)
18 Negative pole of the source supplying constant voltage
19 Positive pole of the source supplying constant voltage
20 Resistance (64 ohm)
21 Transistor
22 Transistor
23 Resistance (1000 ohm)
24 Relay
25, 26 Normally closed contact of relay 24
25', 26' Operating contact of relay 24
27 Condenser (2μf.)
28 Condenser (5μf.)
29 Resistance (1000 ohm)
30 Relay
31 Normally closed contact of relay 30
32 Signal lamp
33 Resistance (150 ohm)
34 Resistance (47 ohm)
35 Condenser (10μf.)
36 Diode (BA 104)
37 Switching point
38 Switching point
39 Starting key
40 Normally closed contact of starting key 39
41 Operating contact of starting key 39
42 Negative pole of auxiliary voltage source
43 Positive pole of auxiliary voltage source In FIG. 3 the charging voltage $U_E$ is applied to the circuit at terminals 18 and 19. This voltage is applied across condenser 35, similar to the application to condenser 1 in FIG. 1, through contacts 41 of starting key 39. Key 39 is comparable to key 3 in FIG. 1. One terminal of condenser 35 is connected to diode 36, comparable to diode 2 in FIG. 1. The other terminal of diode 36 is connected to a point in a voltage divider circuit made up of series resistances 33 and 34 in series with transistor 14 and resistor 15 leading back to the charging voltage. Thus, the diode is connected at point 38, the other terminal of the diode being identified as point 37.

The potential at point 37 between condenser 35 and diode 36 is led to the base of transistor 21 which is arranged in amplifying configuration with transistor 22, such that the emitter of base 21 is connected to the base of 22.

Input leads 42 and 43 provide the potential for operation of the transistors 21 and 22, and the transistors are biased through resistors 16, 17, 23 and 29. The collector circuit of transistor 22 passes through the armature coil of relay 24 to the source of transistor potential 42.

Starting key 39 is associated with relay 24 to control the operation of the circuit.

The battery 12 to be charged is connected to the charging voltage terminals 18 and 19 through resistor 13 and contacts 31 of relay 30.

The device illustrated in FIG. 3 operates essentially in such a manner that condenser 35 is first charged with the total terminal voltage of the source supplying constant voltage 18, 19 by pushing starting key 39 and is discharged via diode 36 and resistance 33 to such an extent that the same potential is attained at switching point 37 as at switching point 38.

The potential at point 38 is directly proportional to the charging current and, due to the voltage division caused by resistances 33, 34, and 29, is always some volts lower than the total constant charging voltage.

As soon as the charging current and, simultaneously, the potential at switching point 38 have traversed the minimum value characteristic for gas-tight alkaline storage batteries, an increasing potential difference is produced between switching points 37 and 38 over blocking diode 36. Said potential difference causes negative biasing of the base of transistor 21 with respect to its emitter. As a result thereof the transistor starts to draw current. The voltage decrease at resistance 16 which is proportional to this transistor current regulates transistor 22 and causes switching of relay 24. Thus relay 30 becomes currentless and discontinues charging of the storage battery by disconnecting operating contact 31.

The other switching operations of the charging control device, not directly concerned with disconnecting the charging current, are also shown in the wiring diagram illustrated in FIG. 3.

In order to illustrate the above-described operation of the current control device, the progress of the potential U at switching point 37 within a certain period of time is plotted as a dotted line and at switching point 38 as a straight line, in FIG. 3*a*. The diagram shows that the potential at point 37 decreases nearly to the potential of point 38 on connecting the device at the time $t_0$ and that it decreases almost to the time $t_{min}$. As soon as the charging current has traversed its minimum value, an increasing potential difference results between points 37 and 38 which is used according to the present invention for controlling the disconnecting mechanism.

Tests have shown that the charging control device according to the present invention is distinguished by an especially high sensitivity of response and operating reliability. An increase of the charging current of less than 100 mA. after the minimum value has been traversed effects disconnection of the current.

The foregoing description and drawings are given merely to explain and illustrate the invention. Those skilled in the art will be able to make modifications and variations therein without departing from the spirit of the invention.

What is claimed is:

1. An electrical switching device for performing a switching action upon the traverse by an input voltage of an extreme value, said device including input terminals for receiving said input voltage, a capacitor and a blocking diode in series across said input terminals, means associated with said diode for momentarily by-passing same before said input voltage has reached its extreme value, output terminals across said diode, and means associated with said output terminals adapted to effect said switching action only upon application to said diode of a voltage in its blocked direction.

2. An electrical switching device responsive to an extreme position of a variable input voltage, said device including a switching circuit, a blocking diode, means adapted to receive the voltage across said diode and to actuate said switching circuit in response only to blocked voltage across said diode, a capacitor in series with said diode, means for applying said input voltage to said series capacitor and diode, and means for momentarily bypassing said diode before said input voltage has reached its extreme position, whereby the voltage impressed upon said capacitor may initially be the voltage of said input voltage.

3. An electrical switching device as set forth in claim 2 including a battery charger controlled by said switching circuit to stop operation of said charger upon completion of charging of a battery.

4. An electrical switching device which effects a switching operation as soon as the input voltage has traversed an extreme value, characterized by the feature, that it consists of the series connection of a condenser and a diode and that the input voltage is applied to said series connection while the output voltage is tapped off over the diode.

5. A device according to claim 4 in which said diode has a polarity such that it prevents charging of said condenser by said input voltage and furthermore characterized by the feature that a switching contact is arranged parallel to said diode.

6. A device according to claim 4 in which said diode has a polarity such that it permits charging of said condenser by said input voltage but prevents discharging thereof.

7. A device according to claim 6 including a relay and a Zener diode connected across said output.

8. A charging control device for charging gas-tight storage batteries under constant voltage by using a switching device according to claim 5, characterized by the feature, that the points of attachment of a resistance, at which a voltage which is directly proportional to the corresponding charging current decreases, are connected with said input connection of the switching device while said output is connected with a device for disconnecting the charging current over an amplifier device.

References Cited by the Examiner

UNITED STATES PATENTS

| | | | |
|---|---|---|---|
| 3,089,072 | 5/1963 | Jephcott | 320—2 |
| 3,123,759 | 3/1964 | Grey | 320—40 |
| 3,196,289 | 7/1965 | Heizer | 307—88.5 |

JOHN F. COUCH, *Primary Examiner.*

S. WEINBERG, *Assistant Examiner.*